Sept. 29, 1959　　　H. L. STADLER　　　2,906,953
DISPLACEMENT AND SPEED MEASURING APPARATUS
Filed Dec. 12, 1956　　　2 Sheets-Sheet 1
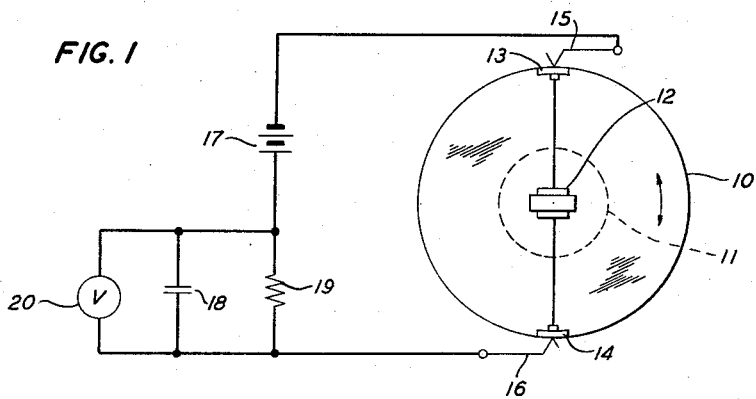
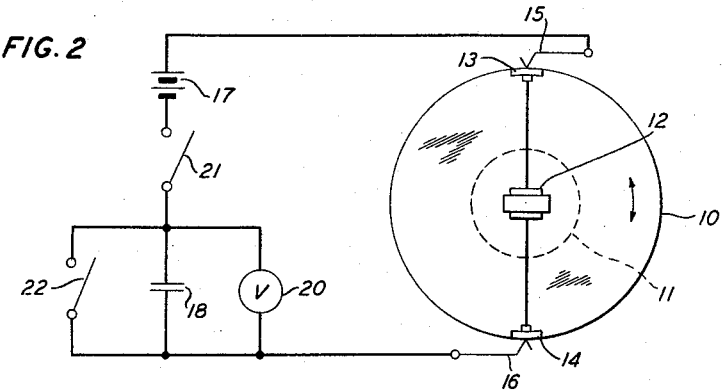
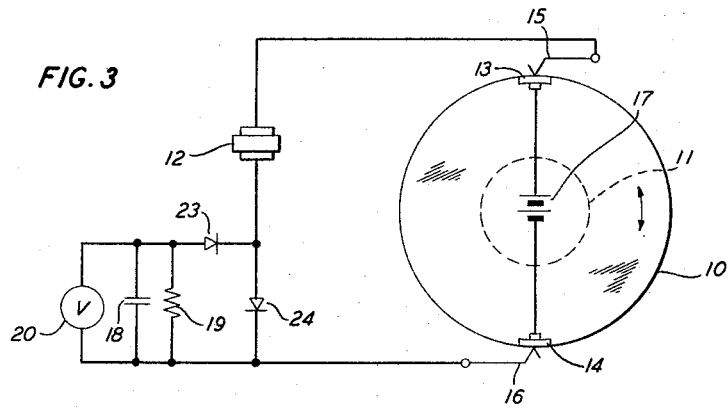
INVENTOR
*H. L. STADLER*
BY
*G. F. Heuerman*
ATTORNEY

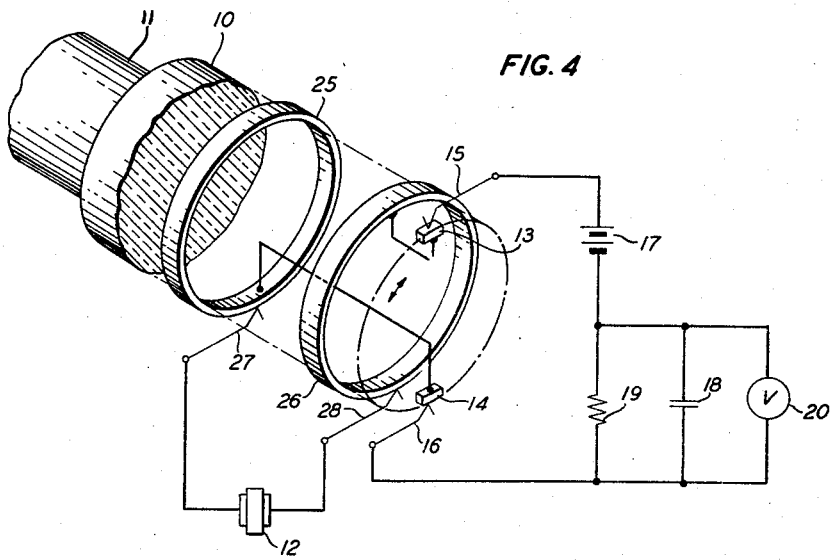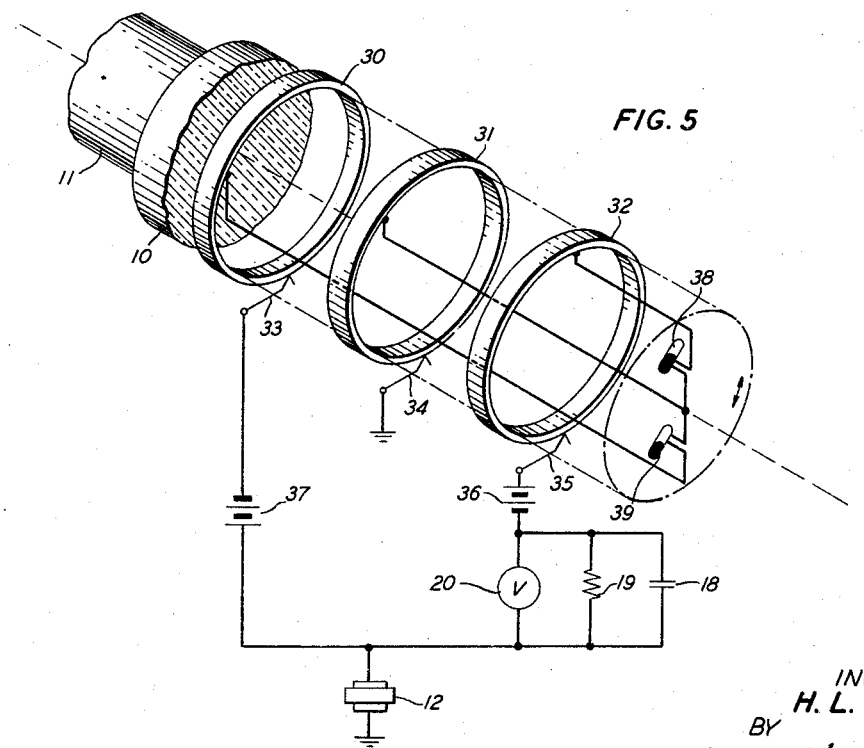

United States Patent Office 2,906,953
Patented Sept. 29, 1959

2,906,953

DISPLACEMENT AND SPEED MEASURING APPARATUS

Henry L. Stadler, Whippany, N.J., assignor to Bell Telephone Laboratories, Incorporated, New York, N.Y., a corporation of New York Application December 12, 1956, Serial No. 627,881

12 Claims. (Cl. 324—70)

This invention relates to displacement and speed measuring apparatus and particularly to apparatus for measuring the angular displacement and speed of a rotating shaft.

An object of the invention is to provide improved apparatus for electrically indicating the displacement or speed of a rotating shaft.

In a specific embodiment of the invention, herein shown and described for the purpose of illustration, there are provided a ferroelectric or saturable condenser and means for repeatedly charging the condenser alternately in opposite directions in response to the rotation of a shaft the angular displacement or speed of which is to be measured. The condenser comprises a pair of electrodes and a dielectric of a single crystal of barium titanate, for example. An impedance is provided in the charging circuit and a voltmeter connected across the impedance is provided for producing an indication of the angular displacement of the shaft or the speed of the shaft. A member of insulating material, a disc, for example, having a pair of diametrically opposed conducting contacts mounted thereon is driven by the shaft. The ferroelectric condenser is mounted on the insulating member and the electrodes of the condenser are conductively connected to the contacts, respectively. Alternatively, a battery for supplying the charging current for the saturable condenser may be mounted on the insulating disc and its terminals connected to the contacts, respectively. The battery voltage should be sufficiently high to charge the condenser to saturation during each charging period. In a modified apparatus, neither the ferroelectric condenser nor the battery is mounted on the rotating insulating member.

For measuring the speed of a shaft, the impedance across which the voltage is measured may comprise a resistor and a capacitor in parallel. The time constant of the resistor and capacitor, that is the product of the resistance and capacitance, should be made small, say, of the order of time for completing a single revolution of the shaft, in order to detect instantaneous changes of the shaft speed. To obtain a steady indication of the average shaft speed, the time constant should be made relatively large, say, of the order of $\frac{1}{10}$ second. To produce an indication of the number of revolutions made by the shaft within a given time period, a still higher time constant should be employed. In this case the resistor across the condenser may be omitted so that the leakage of the charge on the condenser is reduced to a minimum.

The invention will now be described in greater detail with reference to the accompanying drawing in which:

Fig. 1 is a schematic view of apparatus embodying the invention for measuring the speed of a shaft;

Fig. 2 is a schematic view of apparatus embodying the invention for measuring the angular displacement of a shaft; and Figs. 3, 4 and 5 are schematic views of modifications of the apparatus depicted in Figs. 1 and 2.

Referring to Fig. 1 of the drawing, there is provided a member 10 of insulating material secured to a shaft 11 the speed of which is to be measured. Upon the member or disc 10 is mounted a ferroelectric or saturable condenser 12 comprising a pair of electrodes and a dielectric of a ferroelectric substance such as a single crystal of barium titanate. The electrodes of the saturable condenser are connected to metallic contacts 13 and 14, respectively, mounted on the disc 10 at diametrically opposed positions. Stationary brushes 15 and 16 are provided for periodically simultaneously engaging the contacts 13 and 14 as the disc 10 and the shaft 11 rotate. When the brushes 15 and 16 engage the contacts 13 and 14 a charging circuit for the saturable condenser 12 is completed. This charging circuit comprises a direct voltage source or battery 17 and in series therewith an impedance which comprises an ordinary or nonsaturable condenser 18 having a capacitance C and in parallel therewith a resistor 19 having a resistance R. A voltmeter 20 is provided for indicating the voltage across impedance 18, 19.

The voltage of battery 17 is impressed upon the charging circuit for saturable condenser 12 twice per revolution of the disc 10, the charging of the saturable condenser 12 being alternately in opposite direction. The voltage of battery 17 is sufficiently high, 20 volts, for example, to bring the charge on the condenser 12 into the saturation portions of its characterisic voltage-charge curve. In these saturation regions, the rate of change of charge with respect to voltage is relatively small. A charge Q which is switched by the condenser 12 each time a circuit is completed through the contacts 13, 14 and brushes 15, 16 is equal to 52 times $10^{-6}$ coulombs per square centimeter of crystal area when a crystal of barium titanate is used. The change of charge 2Q or about $10^{-4}$ coulombs per square centimeter of crystal area is produced for each revolution of the disc 10. The saturable condenser 12 thus passes a direct current I, in amperes, equal to $10^{-4}$ times the speed of disc 10 in revolutions per second times the crystal area. For example, if the crystal area is 0.4 square centimeter and the speed of the disc is 500 revolutions per minute or 8.3 revolutions per second, the direct current I will equal about 3.3 times $10^{-4}$ ampere.

The voltage across the impedance 18, 19 indicated by the voltmeter 20 is a measure of the current through the ferroelectric condenser 12 and, therefore, of the speed of the disc 10 and of the shaft 11. The time constant $t$ equal to the product of the resistance R of resistor 19 and the capacitance C of condenser 18 determines the length of time over which the speed of the disc 11 is averaged. In order to detect instantaneous changes of the shaft speed, the time constant $t$ should be made small, say, of the order of time required for completing a single revolution of the shaft. In this case, the voltmeter 20 may be replaced by an oscilloscope to better indicate rapid voltage fluctuations corresponding to rapid changes of speed. To obtain a steady indication of the average shaft speed, the time constant $t$ should be made relatively large, say, in the order of $\frac{1}{10}$ second. To count the number of revolutions made by the shaft in a given time a still higher time constant $t$ should be used as described below in connection with Fig. 2 of the drawing. The meter 20 may be calibrated to indicate shaft speed directly rather than to indicate the voltage across impedance 18, 19, if desired.

In the modified embodiments of the invention shown in Figs. 2, 3, 4 and 5 the corresponding parts are designated by the same numerals as are used in Fig. 1. Fig. 2 differs from Fig. 1 in that the resistor 19 of Fig. 1 is omitted from Fig. 2 and in that two switches 21 and 22 are provided in Fig. 2. When switch 21 is closed and switch 22 is open, a pulse of charging current flows into condenser 18 each time that the charging circuit is closed through contacts 13, 14 and brushes 15, 16. During each revolution of the shaft 11, the ferroelectric condenser 12 passes a fixed amount of electric charge which is independent of the shaft speed and voltage changes of the supply source 17, the voltage of battery 17 being sufficiently high to charge the ferroelectric condenser 12 to saturation. The voltage across condenser 18, measured by the meter 20 is therefore proportional to the angular displacement of, or the number of revolutions made by the shaft 11, starting at the time switch 21 is closed. The meter 20 is returned to zero by momentarily closing the switch 22 to discharge condenser 18.

The embodiment of the invention shown in Fig. 3 differs from that shown in Fig. 1 in the following respects. The positions of the saturable condenser 12 and the battery 17 are reversed in Fig. 3 with respect to the positions shown in Fig. 1, battery 17 being mounted on the disc 10 and having its terminals connected to the contacts 13 and 14, respectively. Fig. 3 further differs from Fig. 1 in the provision of rectifier elements 23 and 24, in series, connected across the impedance 18, 19, a terminal of saturable condenser 12 being connected to the common terminual of rectifier elements 23 and 24. When the disc 10 is in the position shown, current flows from the positive terminal of battery 17, through a circuit comprising contact 13, brush 15, saturable condenser 12, rectifier element 24 in its forward or low resistance direction, brush 16 and contact 14 to the negative battery terminal. When the disc 10 is displaced by 180 degrees, current will flow from the positive battery terminal through a circuit comprising contact 13, brush 16, condenser 18, rectifier element 23 in its forward or low resistance direction, saturable condenser 12, brush 15 and contact 14 to the negative battery terminal. Condenser 18 is thus charged to a voltage proportional to the speed of shaft 11.

Fig. 4 differs from Figs. 1 and 3 in the following respects. Neither the battery 17 nor the saturable condenser 12 is mounted on the rotating insulating member 10. Two conducting slip rings 25 and 26 are mounted on the insulating member 10, the slip ring 25 being conductively connected to the contact 14 and the slip ring 26 being conductively connected to the contact 13. There are provided brushes 27 and 28 for engaging slip rings 25 and 26, respectively. The electrodes of ferroelectric condenser 12 are connected to brushes 27 and 28, respectively. With the shaft 11 in the position shown, current flows from the positive terminal of battery 17 through a circuit comprising brush 15, contact 13, slip ring 26, brush 28, saturable condenser 12, brush 27, slip ring 25, contact 14, brush 16 and impedance 18, 19 to the negative battery terminal. When the shaft is displaced by 180 degrees, current flows from the positive battery terminal through a circuit comprising brush 15, contact 14, slip ring 25, brush 27, ferroelectric condenser 12, brush 28, slip ring 26, contact 13, brush 16 and impedance 18, 19 to the negative battery terminal.

Fig. 5 differs from Figs. 1, 3 and 4 as follows: There are provided three conducting slip rings 30, 31 and 32 mounted on the insulating member 10 and brushes 33, 34 and 35 for engaging the slip rings 30, 31 and 32, respectively. Brush 34 is connected to ground. There are provided two similar batteries 36 and 37. Battery 36 has its positive terminal connected to brush 35 and its negative terminal connected to a common terminal of impedance 18, 19 and voltmeter 20. The other common terminal of impedance 18, 19 and voltmeter 20 is connected to the positive terminal of battery 37 and to one electrode of saturable condenser 12, the other electrode of condenser 12 being grounded. The negative terminal of battery 37 is connected to brush 33. There are provided two mercury switches 38 and 39 mounted on the rotatable insulating member 10. Mercury switch 38, when closed, conductively connects the slip ring 31 to slip ring 32. Mercury switch 39, when closed, connects the slip ring 30 to slip ring 31. When the shaft 11 is in the position shown in the drawing, current flows from the positive terminal of battery 36 through a circuit comprising slip ring 32, closed switch 38, slip ring 31, brush 34, ferroelectric condenser 12 and impedance 18, 19 to the negative terminal of battery 36. When shaft 11 is angularly displaced by 180 degrees, switch 38 is open and switch 39 is closed. For this condition, current flows from the positive terminal battery 37, through a circuit comprising saturable condenser 12, brush 34, slip ring 31, switch 39, slip ring 30 and brush 33 to the negative terminal of battery 37. The saturable condenser 12 is thus charged to saturation, alternately in opposite directions, as the shaft 11 rotates. The charging current in one direction flows through impedance 18, 19 to cause the voltmeter 20 to indicate the speed of shaft 11.

What is claimed is:

1. Apparatus for measuring the motion of a rotary shaft comprising a ferroelectric condenser, a circuit including a unidirectional voltage source for charging said condenser sufficiently to saturate it, means responsive to rotation of said shaft for repeatedly reversing said condenser with respect to said voltage source in said circuit and means for producing an indication in response to current in said charging circuit.

2. Apparatus for measuring the motion of a rotary shaft comprising a ferroelectric condenser, a rotary element of insulating material adapted to be driven by said shaft, a pair of diametrically opposed contacts secured to said rotary element, a first current path comprising said condenser connecting said contacts, a pair of brushes adapted to engage said pair of contacts simultaneously as said rotary element rotates, a second current path connected to said brushes including a direct voltage source for charging said condenser to saturate it, and indicating means responsive to the current in said second current path.

3. Apparatus in accordance with claim 2 in which said ferroelectric condenser comprises a dielectric having characteristics substantially like those of a crystal of barium titanate.

4. Apparatus for measuring the motion of a rotary shaft comprising a saturable condenser, a circuit including in series impedance and a direct voltage source for charging said condenser sufficiently to saturate it, means responsive to rotation of said shaft for repeatedly causing said condenser to be charged to saturation in opposite directions alternately by current from said voltage source, and means for measuring the voltage across said impedance.

5. Apparatus in accordance with claim 4 in which said impedance comprises resistance.

6. Apparatus in accordance with claim 4 in which said impedance comprises capacitance.

7. Apparatus for measuring the motion of a rotary shaft comprising a saturable condenser having a capacitance which is larger when said condenser is unsaturated than its capacitance when the condenser is saturated, a circuit including in series a second condenser having a larger capacitance than the maximum capacitance of said saturable condenser and a direct voltage source for charging said saturable condenser sufficiently to saturate it, means for repeatedly reversing said saturable condenser with respect to said voltage source in said charging circuit in response to rotation of said shaft, and means for measuring the voltage across said second condenser.

8. Apparatus in accordance with claim 7 in which there are provided a first switch in said circuit in series with said second condenser and said voltage source and a second switch across said second condenser.

9. Apparatus for measuring the motion of a rotary shaft comprising a ferroelectric condenser, a circuit including in series a resistor and a direct voltage source for charging said condenser sufficiently to saturate it, a second condenser connected across said resistor, a voltmeter connected across said resistor and means responsive to the rotation of said shaft for repeatedly reversing said saturable condenser with respect to said voltage source in said circuit.

10. Apparatus for measuring the motion of a rotary shaft comprising a ferroelectric condenser, a rotary element of insulating material adapted to be driven by said shaft, a pair of diametrically opposed contacts secured to said rotary element, a pair of slip rings secured to said rotary element and conductively connected to said contacts respectively, means comprising a first pair of brushes engaging said slip rings respectively for connecting said condenser to said slip rings, a second pair of brushes adapted to engage said pair of contacts simultaneously as said rotary element rotates, a current path connected to said second pair of brushes including a direct voltage source for repeatedly charging said condenser to saturation as said rotary element rotates, and indicating means responsive to the current in said current path.

11. Apparatus for measuring the motion of a rotary shaft comprising a saturable condenser, means responsive to the rotation of said shaft in a single direction for repeatedly supplying direct current to said condenser to repeatedly charge it to saturation alternately in opposite directions, an impedance, means for causing a portion at least of said charging current to flow through said impedance and indicating means responsive to the voltage across said impedance.

12. Apparatus for measuring the motion of a rotary shaft comprising a rotary element of insulating material, a first, a second and a third slip ring mounted on said rotary element, a first, a second and a third brush for engaging said first, second and third slip rings respectively, a first switch mounted on said rotary element for alternately opening and closing a current path connecting said first and second slip rings, a second switch mounted on said rotary element for alternately opening and closing a current path connecting said second and third slip rings, said first switch being closed and said second switch being opened in response to the rotation of said rotary element to a predetermined angular position, said first switch being opened and said second switch being closed in response to the rotation of said rotary element to a diametrically opposite position with respect to said predetermined position, a ferroelectric condenser, a first circuit for charging said ferroelectric condenser in a predetermined direction comprising a direct voltage source, said first switch and said first and second slip rings, a second circuit for charging said ferroelectric condenser in the opposite direction comprising a direct voltage source, said second switch and said second and third slip rings, and means for producing an indication in response to the current flowing in one of said first and second circuits.

References Cited in the file of this patent

UNITED STATES PATENTS

| | | |
|---|---|---|
| 1,513,071 | Russell | Oct. 28, 1924 |
| 1,809,683 | Fitzgerald | June 9, 1931 |
| 2,063,701 | Seyfert | Dec. 8, 1936 |
| 2,473,542 | Philpott | June 21, 1949 |